United States Patent
Alarcon Hernandez et al.

(10) Patent No.: US 10,144,385 B2
(45) Date of Patent: Dec. 4, 2018

(54) SIDE CURTAIN INCLUDING A STRIP CONNECTED TO AN INBOARD PANEL

(71) Applicant: Ford Global Technologies, LLC, Dearborn, MI (US)

(72) Inventors: Jesus A. Alfonso Alarcon Hernandez, Toluca (MX); Zhibing Deng, Northville, MI (US); Oscar Olguin, Metepec (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/383,042

(22) Filed: Dec. 19, 2016

(65) Prior Publication Data

US 2018/0170301 A1    Jun. 21, 2018

(51) Int. Cl.
| | |
|---|---|
| *B60R 21/232* | (2011.01) |
| *B60R 21/214* | (2011.01) |
| *B60R 21/231* | (2011.01) |
| *B60R 21/00* | (2006.01) |
| *B60R 21/2338* | (2011.01) |

(52) U.S. Cl.
CPC .......... *B60R 21/232* (2013.01); *B60R 21/214* (2013.01); *B60R 21/23138* (2013.01); *B60R 2021/0048* (2013.01); *B60R 2021/23161* (2013.01); *B60R 2021/23386* (2013.01)

(58) Field of Classification Search
CPC ............ B60R 21/232; B60R 21/23138; B60R 21/214; B60R 2021/23386; B60R 2021/0048; B60R 2021/23161
See application file for complete search history.

(56) References Cited

U.S. PATENT DOCUMENTS

| | | | | |
|---|---|---|---|---|
| 6,135,490 A | * | 10/2000 | Spary | .................... B60R 21/213 280/730.2 |
| 7,549,672 B2 | | 6/2009 | Sato et al. | |
| 7,712,773 B2 | * | 5/2010 | Walston | .................. B60R 21/08 280/730.2 |
| 7,942,444 B2 | * | 5/2011 | Steinbach | ............. B60R 21/232 280/730.2 |
| 7,988,187 B2 | | 8/2011 | Yamamura et al. | |

(Continued)

FOREIGN PATENT DOCUMENTS

| | | |
|---|---|---|
| CN | 203543883 U | 4/2014 |
| JP | 2011068290 A | 4/2011 |

OTHER PUBLICATIONS

Search Report issued by the United Kingdom Intellectual Property Office dated Jun. 8, 2018 regarding GB Application No. 1720977.5 (4 pages).

*Primary Examiner* — Drew J Brown
(74) *Attorney, Agent, or Firm* — Frank A. MacKenzie; Bejin Bieneman PLC

(57) ABSTRACT

An airbag includes a panel and a strip. The panel defines an inflation chamber inflatable to an inflated position. The panel includes a top and a bottom spaced from the top along an axis in the inflated position. The strip is connected to the panel and disposed external to the inflation chamber. The strip is elongated in a direction from the top to the bottom of the panel. During a vehicle impact, the momentum of the occupant may move the occupant towards the strip. The strip may absorb energy from the occupant to reduce or prevent the head of the occupant from rotating.

16 Claims, 9 Drawing Sheets

(56) References Cited

U.S. PATENT DOCUMENTS

| | | | |
|---|---|---|---|
| 8,360,469 B2* | 1/2013 | Wiik | B60R 21/23138 |
| | | | 280/730.2 |
| 8,690,187 B2 | 4/2014 | Fukawatase | |
| 9,272,682 B2 | 3/2016 | Wang et al. | |
| 9,713,999 B2* | 7/2017 | Kwon | B60R 21/232 |
| 2006/0157958 A1* | 7/2006 | Heudorfer | B60R 21/232 |
| | | | 280/730.2 |
| 2008/0106083 A1 | 5/2008 | Walston | |
| 2011/0272928 A1 | 11/2011 | Czach | |
| 2012/0193897 A1* | 8/2012 | Ruedisueli | B60R 21/21 |
| | | | 280/730.2 |
| 2014/0217709 A1* | 8/2014 | Fukawatase | B60R 21/232 |
| | | | 280/730.2 |
| 2015/0307057 A1* | 10/2015 | Moon | B60R 21/232 |
| | | | 280/728.2 |
| 2016/0221527 A1* | 8/2016 | Sugimori | B60R 21/232 |

* cited by examiner

SIDE CURTAIN INCLUDING A STRIP CONNECTED TO AN INBOARD PANEL

BACKGROUND

During a vehicle impact, occupants may move in a direction influenced by the momentum of a vehicle. Some vehicle impacts, e.g., side impact, frontal offset impacts, far side oblique impacts, near side oblique impacts, etc., may cause the occupants to move at an angle towards vehicle components, e.g., toward an A-pillar, hinge pillar, door, etc. In this situation, the movement of the occupant may result in an increase in brain injury criteria (BrIC), which is a cumulative measurement of rotation of the head of the occupant. A formula for BrIC is standardized by the National Highway Traffic Safety Administration (NHTSA).

During the impact, the head of the occupant may be forced into the airbag to a peak impact position. After the head of the occupant reaches the peak impact position, the head of the occupant may rebound away from the peak impact position, i.e., away from the airbag. BrIC may not increase during the rebound while the head of the occupant remains in contact with the airbag. Following separation of the head of the occupant from the airbag, BrIC may increase as the occupant impacts vehicle components.

DETAILED DESCRIPTION

Figure 1:
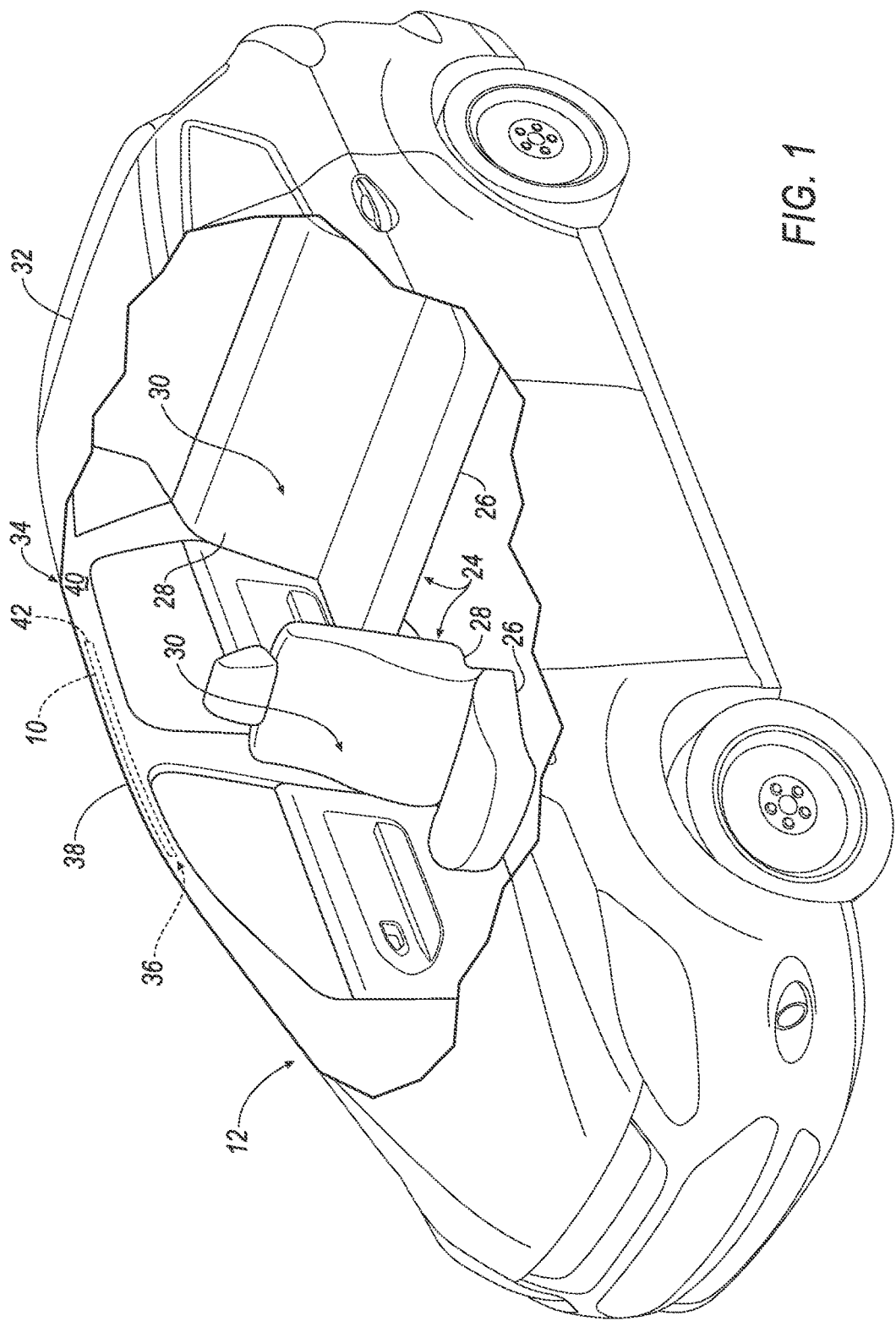
FIG. 1 is a perspective view of a vehicle including an airbag supported by a roof with the airbag in an uninflated position.

With reference to the Figures, wherein like numerals indicate like parts throughout the several views, an airbag 10 of a vehicle 12 includes a panel 14 and a strip 16. The panel 14 defines an inflation chamber 18 inflatable to an inflated position. The panel 14 includes a top 20 and a bottom 22 spaced from the top 20 along an axis A in the inflated position. The strip 16 is connected to the panel 14 and disposed external to the inflation chamber 18. The strip 16 is elongated in a direction from the top 20 to the bottom 22 of the panel 14.

During a vehicle impact, the airbag 10 may be inflatable from an uninflated position, as shown in FIG. 1, to the inflated position (which is the same position as the inflated position of the inflation chamber 18 set forth above), as shown in FIGS. 2-8. During the vehicle impact, an occupant may be forced into the strip 16 of the airbag 10 in the inflated positon. Some vehicle impacts, e.g., side impacts, front offset impacts, far side oblique impacts, near side oblique impacts, etc., may cause the occupant to move at an angle toward vehicle components, e.g., toward an A-pillar, hinge pillar, door, etc. During these types of impacts, the strip 16 may slow or stop the head of the occupant from rebounding off of the airbag 10 to reduce the likelihood of the head of the occupant impacting components of the vehicle 12. In this situation, as the head of the occupant impacts the panel 14, the strip 16 may partially cover the head of the occupant to absorb energy from the head of the occupant rebounding off of the panel 14. When the panel 14 is impacted by the occupant, the strip 16 may create a pocket 88 around the head of the occupant to assist in maintaining contact between the head of the occupant and the panel 14 of the airbag 10 and to reduce the rotation of the head of the occupant. The strip 16 may assist in limiting or preventing rebound of the head of the occupant from the airbag 10 and/or head rotation after contact with the airbag 10, which may reduce head injury criteria (HIC) and/or brain injury criteria (BrIC). Formulae for HIC and BrIC are standardized by the National Highway Traffic Safety Administration (NHTSA).

Figure 2:
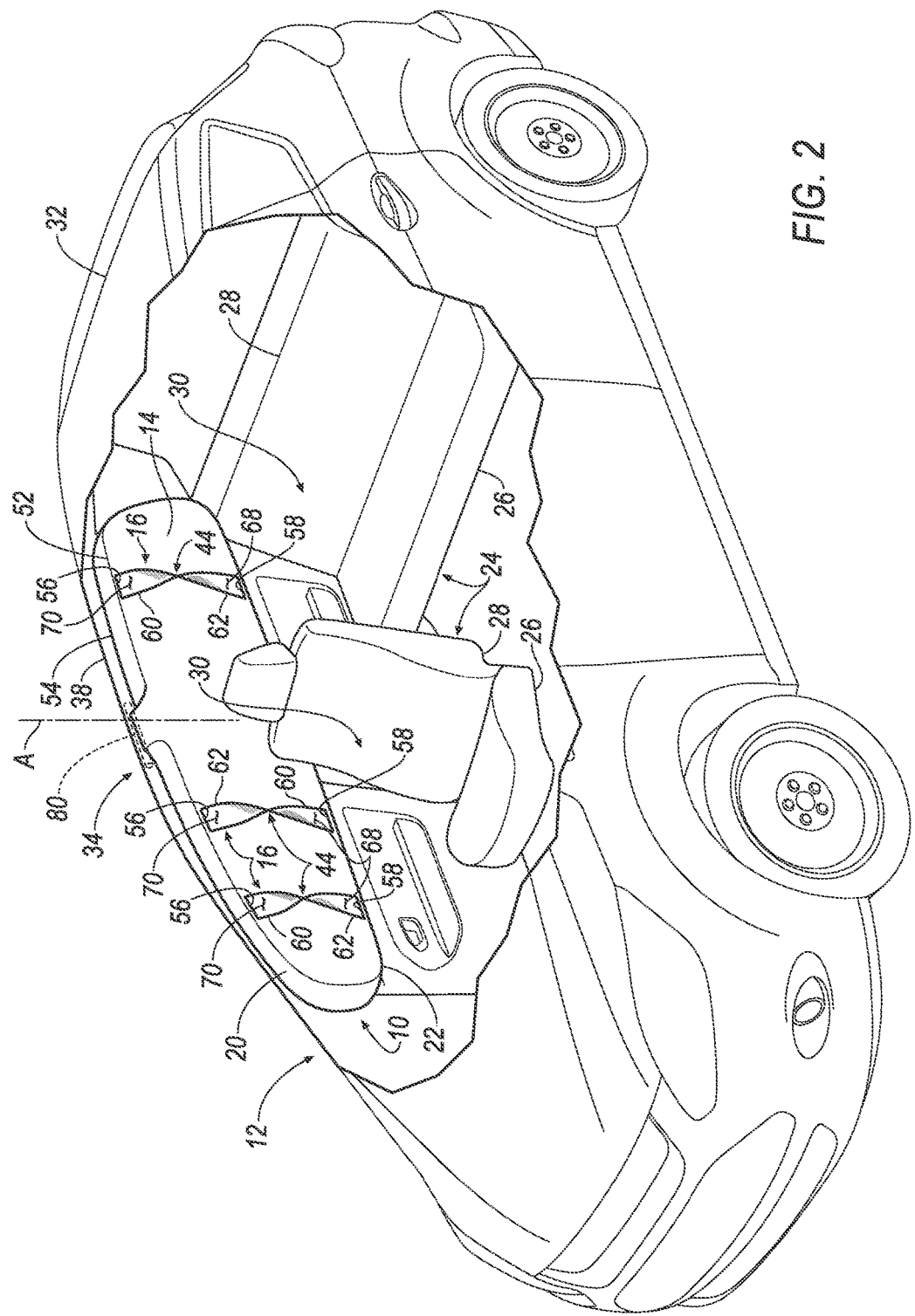
FIG. 2 is a perspective view of FIG. 1 including the airbag in an inflated position and including a plurality of strips elongated from a top to a bottom of a panel and disposed adjacent to each of a seat and a rear seat.

The vehicle 12 may, for example, be any suitable type of automobile. As shown in FIG. 1, the vehicle 12 may include one or more seats 24. For example, as shown in FIGS. 1 and 2, the seats 24 may be arranged in a front row and a rear row. Alternatively, the seats 24 may be arranged in any suitable number of rows, i.e., one or more. The seats 24 and the airbag 10 may be arranged such that the airbag 10 is adjacent to the seats 24, i.e., the front row and the rear row, in the inflated position, as shown in FIG. 2. The seat 24 may be, for example, a bucket seat, a bench seat, a child seat, a booster seat, or any other suitable type of seat. The airbag 10 may include any suitable number of strips 16, e.g., one strip 16 for each row of seats 24 and one strip 16 adjacent to the A-pillar, as shown in FIG. 2.

With continued reference to FIG. 1, the seat 24 may include a seat bottom 26. A seatback 28 may extend upwardly from the seat bottom 26 and may recline relative to the seat bottom 26. The seatback 28 and the seat bottom 26 may define an occupant region 30. The occupant region 30 may extend from the seat bottom 26 in a first direction towards a roof 32 and in a second direction from the seatback 28 along the roof 32. The occupant region 30 may extend any sufficient amount in each direction to contain the occupant, e.g., the head of the occupant, within the occupant region 30. As shown in FIG. 2, the strip 16 may be disposed adjacent to the occupant region 30 when the airbag 10 is in the inflated position. In other words, the strip 16 may be aligned with the head of the occupant when the occupant is in the seat 24. Additionally, as shown in FIG. 2, the strip 16 may be disposed adjacent to the A-pillar such that during an oblique impact the head of the occupant may be forced towards the strip 16, i.e., towards the A-pillar.

As shown in FIGS. 1 and 2, the vehicle 12 may include a passenger restraint system 34 having the roof 32 and an airbag assembly 36, which includes the airbag 10. The roof 32 may support the airbag assembly 36, and specifically, may support the airbag 10 when the airbag 10 is in the inflated position. The airbag assembly 36 may be mounted to the roof 32, as set forth below. When the airbag 10 is in the inflated position, the roof 32 may provide a counteracting force against the airbag 10 when the airbag 10 is impacted by the head of the occupant such that the airbag 10 is squeezed between the head of the occupant and the roof 32. The airbag 10 may be of the type referred to as a "side air curtain."

With continued reference to FIG. 1, the roof 32 may include a plurality of roof side rails 38 and a plurality of roof cross-beams (not shown) supported by the roof side rails 38. The roof 32 may include a headliner 40, as shown in FIG. 1, supported by the roof cross-beams. The headliner 40 may be disposed between the occupant and the airbag 10 in the uninflated position. In other words, the airbag 10 may be disposed between the roof 32 and the headliner 40 in the uninflated positon.

With continued reference to FIG. 1, the airbag assembly 36 may include a base 42 attached to the roof 32, and supporting the airbag 10. The base 42 may house the airbag 10 in the uninflated position and may support the airbag 10 on the roof 32 in the inflated position. The base 42 may, for example, include clips, panels, etc. for attaching the airbag 10 and for attaching the airbag assembly 36 to the roof 32, e.g., the roof side rails 38.

Figure 4:
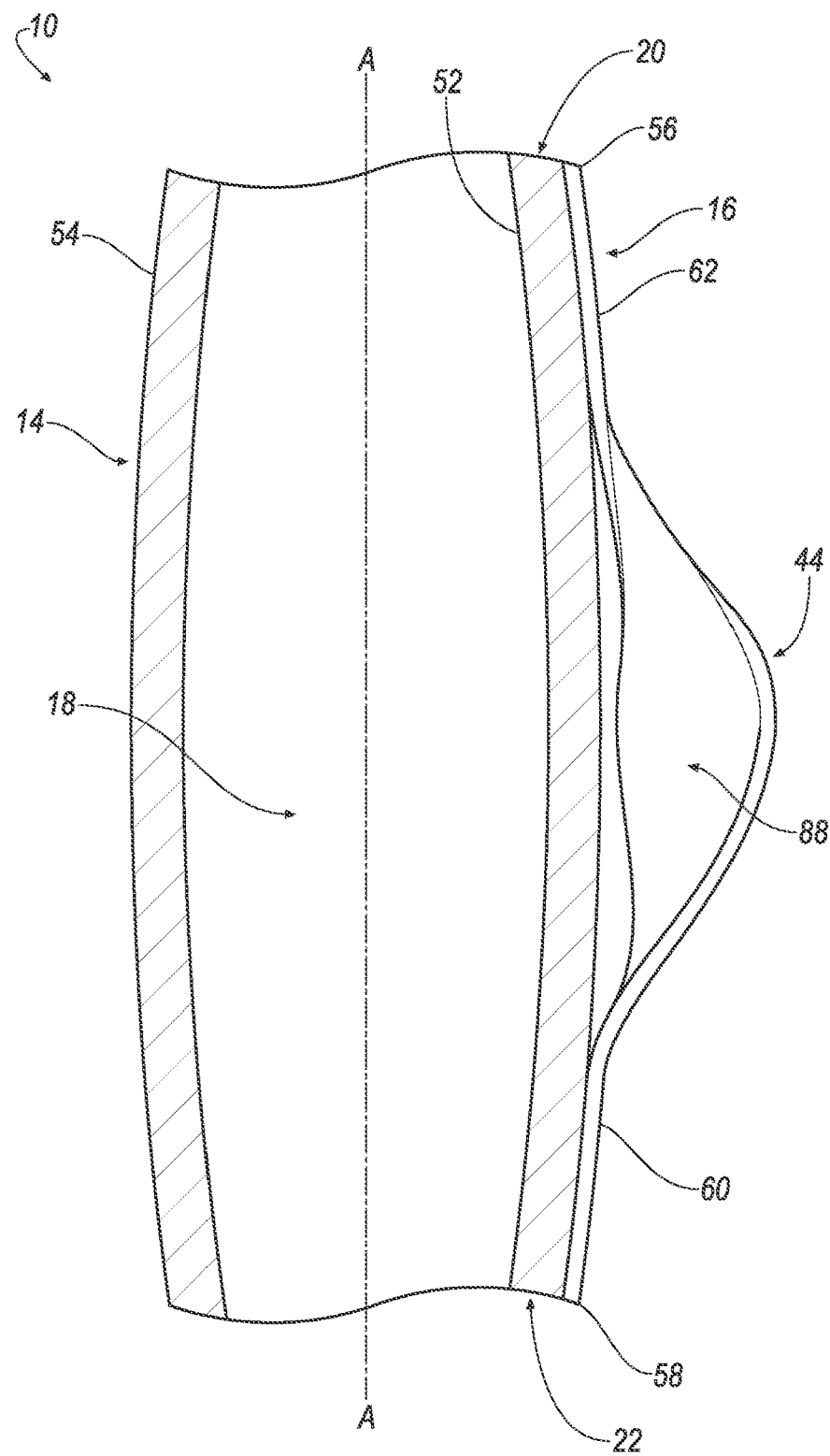
FIG. 4 is a cross-sectional view of the airbag along line 4 in FIG. 3.
Figure 5:
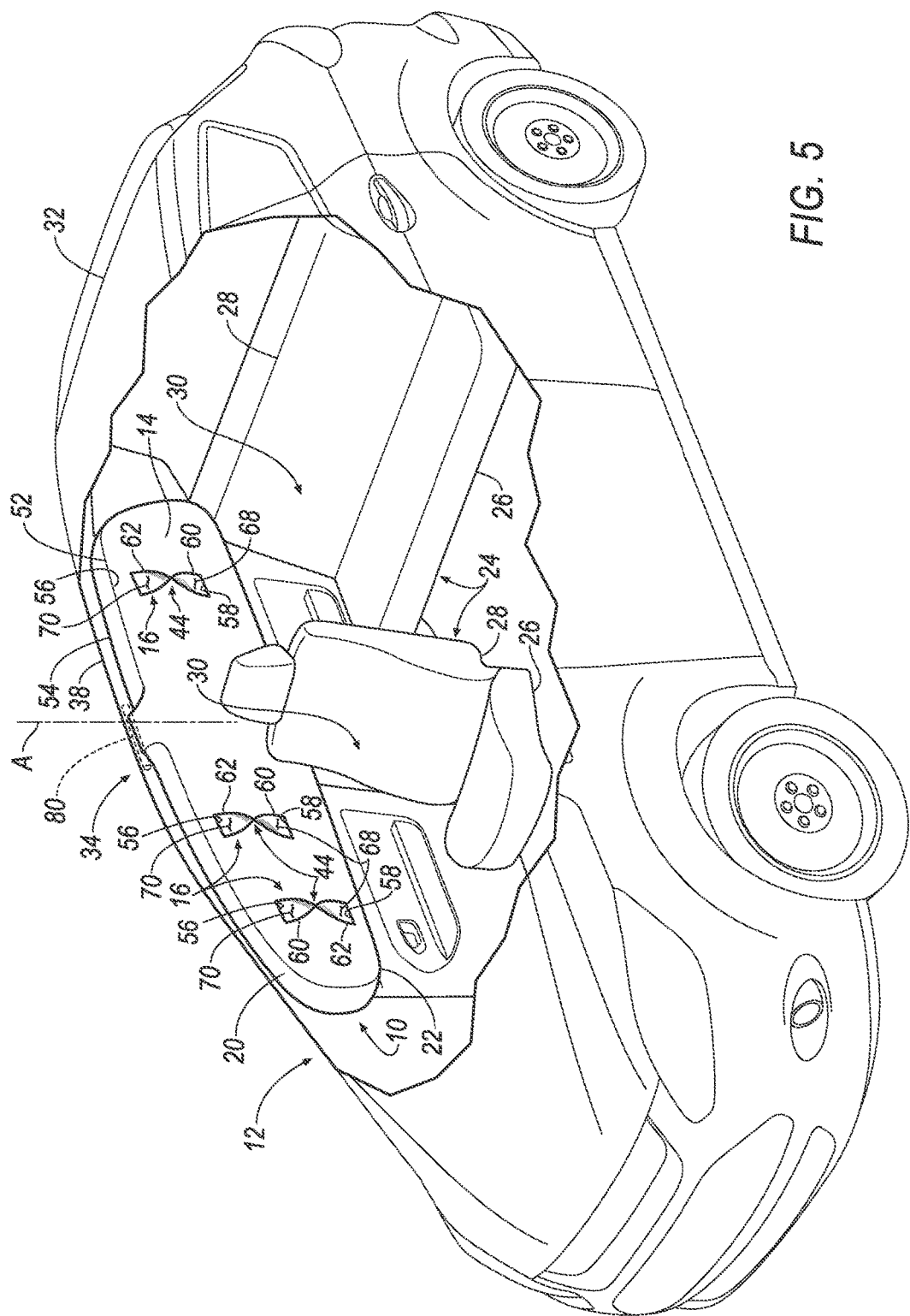
FIG. 5 is a perspective view of another embodiment of the airbag in the inflated position including one twist in each strip and the top edge of each strip spaced from the top of the panel and the bottom edge of each strip spaced from the bottom of the panel.
Figure 6:
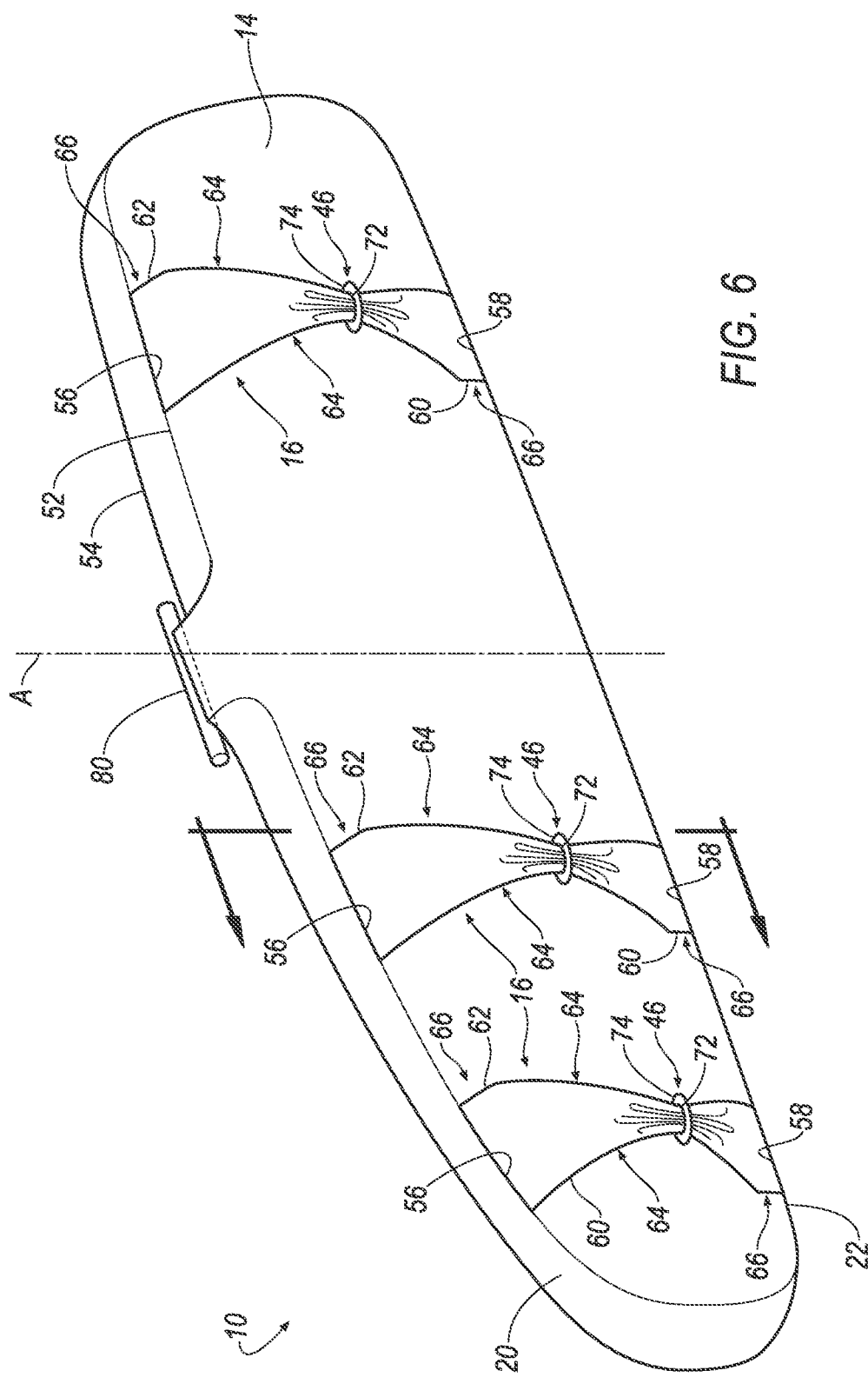
FIG. 6 is a perspective view of another embodiment of the airbag in the inflated position including the top edge and the bottom edge of each strip connected to the panel and a ring extending around each strip between the top edge and the bottom edge of each strip.
Figure 7:
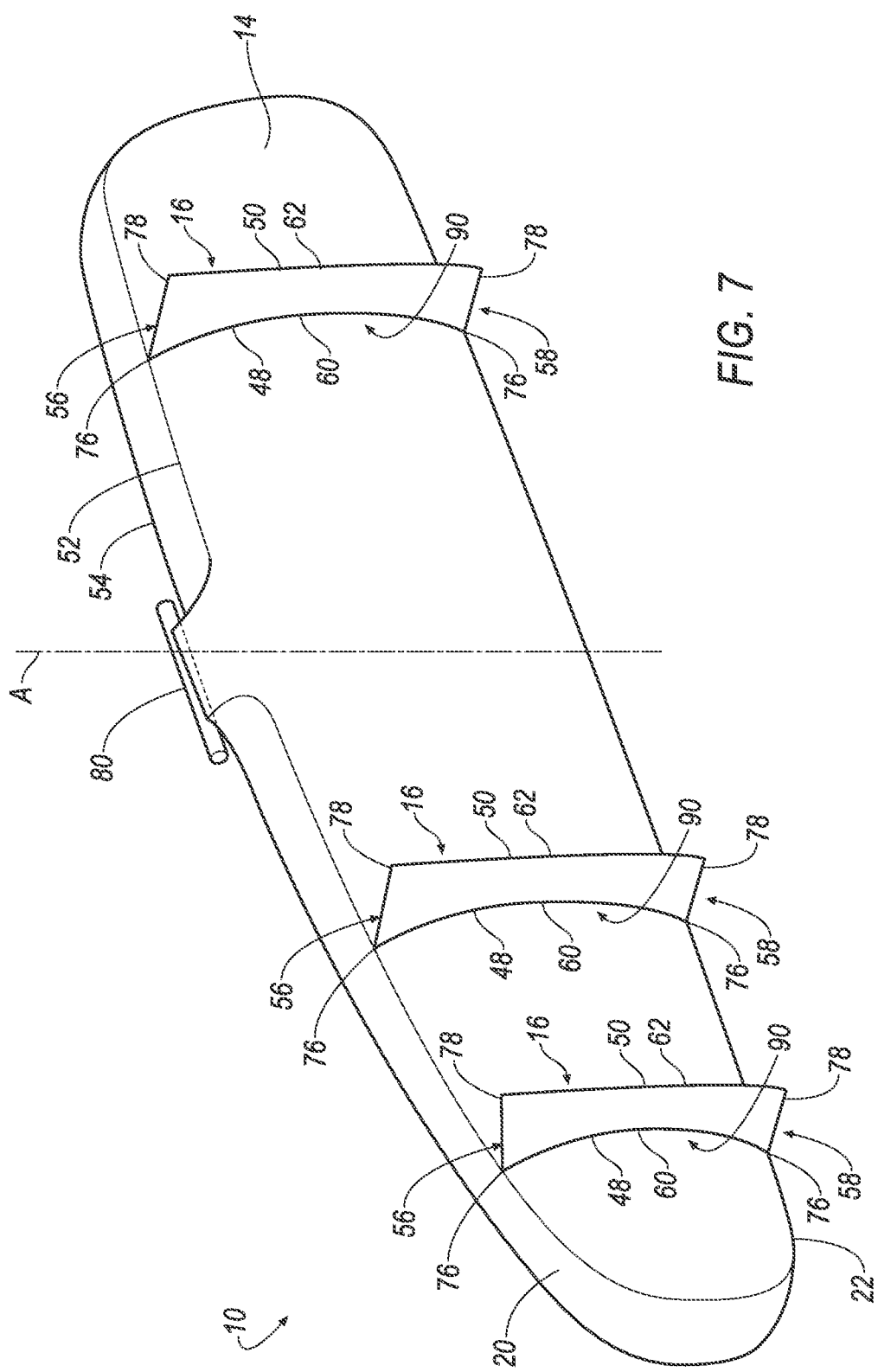
FIG. 7 is a perspective view of another embodiment of the airbag in the inflated position including an inner side of each strip that abuts the panel in a direction from the top to the bottom and an outer side of each strip spaced from the inner side.
Figure 8:
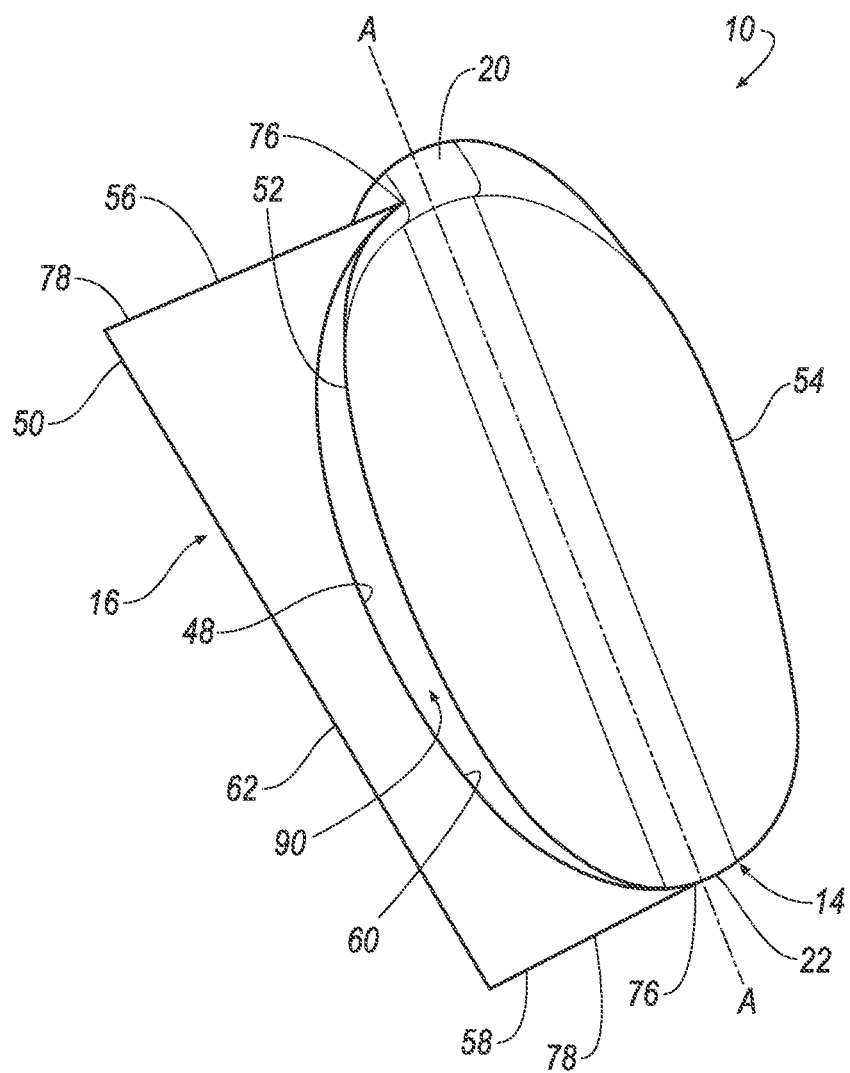
FIG. 8 is a front view of the airbag of FIG. 7 including the inner side of the strip matching the curved contour of the airbag

As set forth further below, one embodiment of the airbag 10 is shown in FIGS. 2-5, another embodiment of the airbag 10 is shown in FIG. 6, and yet another embodiment is shown in FIGS. 7 and 8. Specifically, in the embodiment shown in FIGS. 2-5, the strip 16 may have one twist 44 between the top 20 and the bottom 22 of the panel 14. In the embodiment shown in FIG. 6, the airbag 10 may include a ring 46 extending around the strip 16 between the top 20 and the bottom 22 of the panel 14. In the embodiment shown in FIGS. 7 and 8, the strip 16 may include an inner side 48 extending along the panel 14 in a direction from the top 20 to the bottom 22 of the panel 14 and an outer side 50 spaced from the inner side 48. Common numerals are used to identify common features in the three embodiments.

The airbag 10, e.g., the panel 14 and/or the strip 16, may be formed of any suitable type of material, e.g., from a woven polymer. For example, the airbag 10 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

As set forth above, the panel 14 includes the top 20 and the bottom 22 spaced from the top 20 along the axis A in the inflated position. The top 20 is adjacent to the roof 32 and the bottom 22 is spaced from the roof 32 in the inflated position. During inflation, the panel 14 may extend along the axis A in a direction away from the roof 32 from the uninflated position to the inflated position.

The panel 14 may be a single continuous unit, e.g., a single piece of fabric. Alternatively, the panel 14 may include a plurality of segments, i.e., two or more, connected to each other. The segments may be connected to each other in any suitable fashion, e.g., a plurality of panels connected by stitching, ultrasonic welding, etc.

The panel 14 may include an inboard side 52 and an outboard side 54 spaced from the inboard side 52 in the inflated position. For example, the inboard side 52 may be adjacent to the seat 24, i.e., the occupant region 30, in the inflated position. In other words, the inboard side 52 may be between the occupant and the inflation chamber 18 in the inflated positon.

The outboard side 54 of the panel 14 may be adjacent to the inflation chamber 18 and face away from the seat 24 in the inflated position. For example, the inflation chamber 18 may be disposed between the outboard side 54 of the panel 14 and the seat 24. In other words, the outboard side 54 of the panel 14 may be between the inflation chamber 18 and vehicle components, e.g., the door in the inflated positon.

Figure 3:
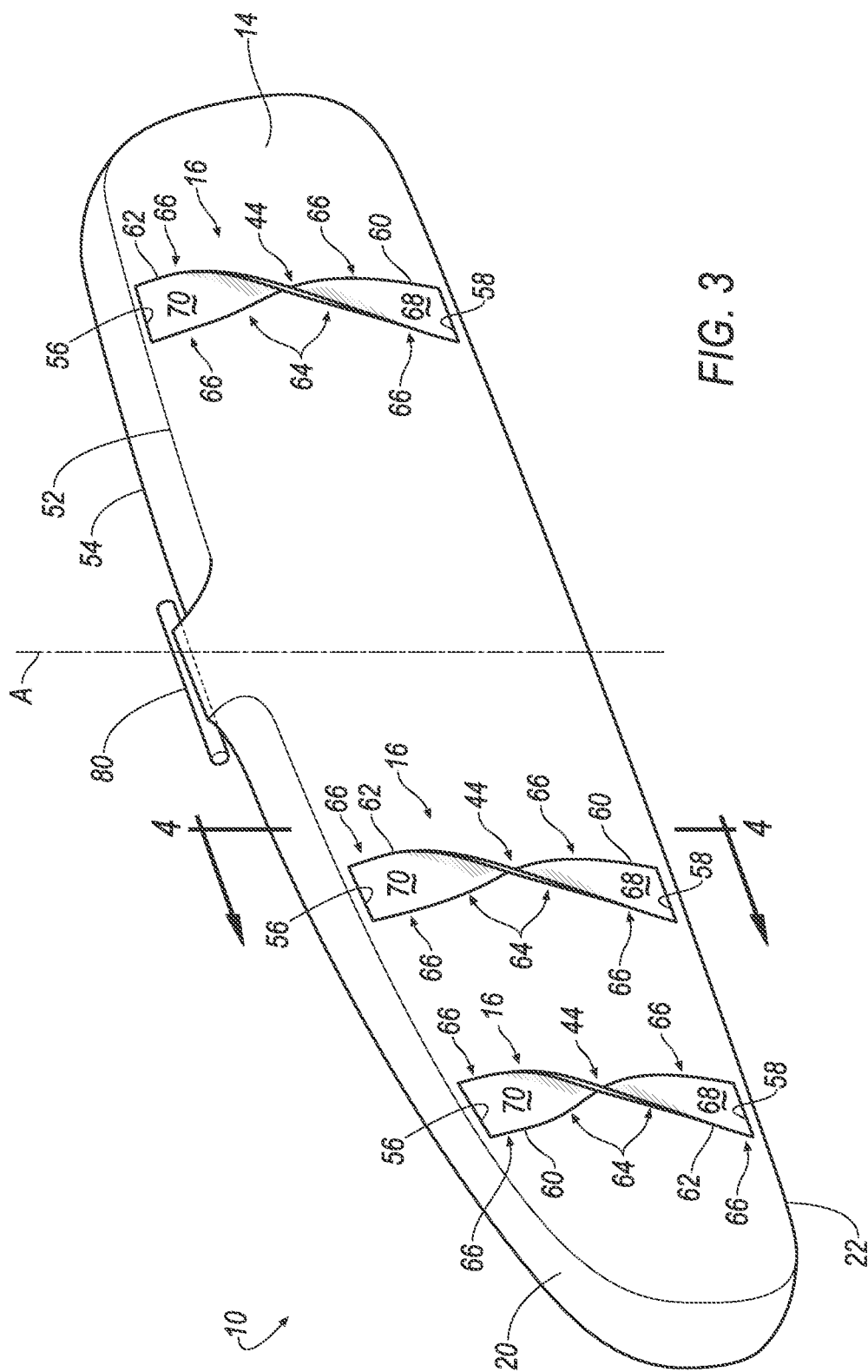
FIG. 3 is a perspective view of one embodiment of the airbag in the inflated position including one twist in each strip between a top edge to a bottom edge of each strip.

As set forth above, the strip 16 may be elongated in a direction from the top 20 to the bottom 22 of the panel 14. In other words, the strip 16 may be elongated along the axis A. The strip 16 may be elongated in a direction from the top 20 to the bottom 22 of the panel 14 any suitable amount. For example, the strip 16 may be elongated from the top 20 to the bottom 22, as shown in FIG. 3. Alternatively, the strip 16 may be elongated from any suitable position between the top 20 and the bottom 22 to any suitable position between the top 20 and the bottom 22, as shown in FIG. 5. In other words, the strip 16 may be spaced from each of the top 20 and the bottom 22 of the panel 14.

The strip 16 may include a top edge 56, a bottom edge 58 spaced from the top edge 56, and two side edges 60, 62 spaced from each other and extending to the top edge 56 and the bottom edge 58. The top and bottom edges 56, 58 of the strip 16 are adjacent to the top 20 and bottom 22 of the panel 14, respectively. For example, the top edge 56 of the strip 16 may abut the top 20 of the panel 14, and the bottom edge 58 of the strip 16 may abut the bottom 22 of the panel 14, as shown in FIGS. 2 and 3. Alternatively, with reference to FIG. 5, the top edge 56 of the strip 16 may be spaced from the top 20 of the panel 14 along the axis A, and/or the bottom edge 58 of the strip 16 may be spaced from the bottom 22 of the panel 14 along the axis A. The strip 16 may be formed of a same or different material as the airbag 10, i.e., the panel 14. For example, the strip 16 may be formed of a material that is stretchable relative to the material of the airbag. In this example, the strip 16 may stretch when impacted by the occupant to increase the likelihood that the momentum of the occupant is slowed or stopped by the strip 16. For example, the strip 16 may be formed of rubber or another elastomeric material. As another example, the strip 16 may be formed of a mesh material, i.e., loosely woven threads.

As set forth above, the strip 16 is disposed external to the inflation chamber 18 of the panel 14. For example, the strip 16 is adjacent to the inboard side 52 of the panel 14. In other words, the strip 16 is external to the panel 14 of the airbag 10, with the inboard side 52 of the panel 14 between the inflation chamber 18 and the strip 16, as shown in FIG. 4.

The top edge 56 and the bottom edge 58 of the strip 16 may be connected to the panel 14. For example, the top and bottom edges 56, 58 may be connected to the inboard side 52 of the panel 14. One and/or the other side edge 60, 62 may be at least partially disconnected from the panel 14 in a direction from the top 20 to the bottom 22. In this situation, one and/or the other side edge 60, 62 may include a disconnected portion 64 disconnected from the panel 14 and a connected portion 66 connected to the panel 14. For example, the disconnected portion 64 of one and/or the other side edge 60, 62 may extend transverse to the panel 14 in the inflated position. In other words, the disconnected portion 64 of one and/or the other side edge 60, 62 may be spaced from the airbag 10 in the inflated position.

The strip 16, i.e., the edges 56, 58, 60, 62, may be connected to the inboard side 52 of the panel 14 in any suitable manner. For example, the strip 16, i.e., the edges 56, 58, 60, 62, may be stitched to the inboard side 52 of the panel 14. Alternatively, the strip 16, i.e., the edges 56, 58, 60, 62, may be attached by adhesive, ultrasonic welding, or any other suitable manner.

In the embodiment shown in FIGS. 2-5, the strip 16 has one twist 44 between the top edge 56 and the bottom edge 58, as set forth above. The strip 16 may include a first surface 68 and a second surface 70 facing away from the first surface 68. The first surface 68 of the strip 16 may be attached to the inboard side 52 of the panel 14 along the top edge of the strip 16, i.e., adjacent to the top 20 of the panel 14. In other words, the second surface 70 may face away from the inboard side 52 of the panel 14, e.g., towards the occupant, as shown in FIG. 3. The second surface 70 of the strip 16 may be attached to the inboard side 52 of the panel 14 along the bottom edge 58 of the strip 16, i.e., adjacent to the bottom 22 of the panel 14. In other words, the first surface 68 may face away from the inboard side 52 of the panel 14, e.g., towards the occupant, as shown in FIG. 3. For example, the strip 16 may be attached to the panel 14 on the first surface 68 along the top edge and the strip 16 may be rotated, e.g., 180 degrees, about the axis A such that the second surface 70 may be attached to the panel 14, i.e., the inboard side 52, along the bottom edge 58. In other words, the first surface 68 lies flat against the inboard side 52 at the top edge of the strip 16, the second surface 70 lies flat against the inboard side 52 at the bottom edge 58, and the twist 44 is disposed between the top edge and the bottom edge 58.

The twist 44 may be spaced from the inboard side 52 of the panel 14, e.g., towards the seat 24, as shown in FIG. 4. The twist 44 may include one side edge 60 traversing over the other side edge 62. In this situation, the two side edges 60, 62 of the strip 16 may each extend obliquely, i.e., diagonally, from each of the top and bottom edges 56, 58 of the strip 16. For example, the side edges 60, 62 may extend transverse to each other. At the twist 44, i.e., when the two side edges 60, 62 converge, one side edge 60 may extend over, e.g., partially overlap, the other side edge 62, as shown in FIG. 3. In other words, one side edge 60 may pass under the other side edge 62 at the twist 44. The twist 44 may be disposed at any suitable position between the top and bottom edges 56, 58 of the strip 16.

The strip 16 may have any suitable shape. For example, the strip 16 may be rectangular. Alternatively, the strip 16 may be trapezoidal-shaped, parallelogram-shaped, or any other suitable shape.

With continued reference to FIGS. 2-5, in operation, the twist 44 may be disposed on the strip 16 such that the twist 44 is adjacent to the head of the occupant, i.e., in the occupant region 30. The twist 44 in the strip 16 may create the pocket 88 between the strip 16 and the inboard side 52 of the panel 14. During the vehicle impact, the momentum of the occupant may force the occupant into the inboard side 52 of the panel 14. Specifically, the head of the occupant may be forced into the pocket 88, i.e., between the inboard side 52 of the panel 14 and the strip 16, and may be partially covered by the strip 16, e.g., the twist 44. In other words, the pocket 88 faces the occupant and receives the head of the occupant during the vehicle impact. After impacting the inboard side 52 of the panel 14, the head of the occupant may rebound away from the inboard side 52 of the panel 14 towards vehicle components. In this situation, the head of the occupant may impact the strip 16, i.e., the twist 44.

While the head of the occupant is rebounding, the twist 44 may assist in increasing the tension on the strip 16 adjacent to the head of the occupant. The strip 16 may provide a counteracting force to the head of the occupant rebounding from the panel 14 to increase the time that the head of the occupant is contacting the panel 14.

In the embodiment shown in FIG. 6, the airbag 10 includes the ring 46 extending around the strip 16 and disposed between the top edge and the bottom edge 58 of the strip 16, i.e., between the top 20 and the bottom 22 of the panel 14, as set forth above. The ring 46 may include an inner radius 72 abutting the strip 16 and an outer radius 74 spaced from the inner radius 72. The outer radius 74 may be spaced from the strip 16 and abut the inboard side 52 of the panel 14. The strip 16 may have a same or different shape as the strip 16 in the embodiments shown in FIG. 2-5.

As shown in FIG. 6, the inner radius 72 may extend around the two side edges 60, 62 of the strip 16. In other words, the strip 16 may extend through the inner radius 72. Each of the side edges 60, 62 may be partially disconnected from the inboard side 52 of the panel 14, as set forth above. The inner radius 72 may extend around the disconnected portion 64 of each side edge 60, 62. The inner radius 72 is disconnected from the strip 16 and the outer radius 74 is disconnected from the panel 14. In other words, the ring 46 is movable on the strip 16. For example, the ring 46 may move, i.e., slide, along the strip 16 in a direction from the top edge to the bottom edge 58 of the strip 16.

The ring 46 may be formed of a same or different material as the airbag 10, i.e., the panel 14. The ring 46 may be formed of any suitable type of fabric. For example, the ring 46 may be formed of woven nylon yarn, e.g., nylon 6. Other suitable exampled include polyether ether ketone (PEEK), polyetherketoneketone (PEKK), polyester, or any other suitable polymer.

With continued reference to FIG. 6, in operation, the strip 16 may be partially spaced from the panel 14. For example, the disconnected portion 64 of each side edge 60, 62 may be spaced from the inboard side 52 of the panel 14, as set forth above. In other words, the disconnected portion 64 of each side edge 60, 62 of the strip 16 may create the pocket 88 between the strip 16 and the panel 14. During the vehicle impact, the momentum of the occupant may force the occupant into the inboard side 52 of the panel 14. Specifically, the head of the occupant may be forced into the inboard side 52 of the panel 14 adjacent to the strip 16, i.e., into the pocket 88, and may be partially covered by the strip 16, e.g., the disconnected portion 64 of the side edges 60, 62. After impacting the inboard side 52 of the panel 14, the head of the occupant may rebound away from the inboard side 52 of the panel 14 towards vehicle components. In this situation, the head of the occupant may impact the strip 16, e.g., the disconnected portion 64 of the side edges 60, 62. When the strip 16 is impacted by the head of the occupant, the ring 46 may move, i.e., slide along the strip 16. For example, the ring 46 may move to the edge, e.g., the top edge 56 or the bottom edge 58, opposite of the edge, e.g., the top edge 56 or the bottom edge 58, impacted by the head of the occupant. In this situation, the ring 46 may limit the separation between the strip 16 and the panel 14 and may assist in increasing the tension of the strip 16 adjacent to the head of the occupant. The strip 16 may provide a counteracting force to the head of the occupant rebounding from the panel 14 to increase the time that the head of the occupant is contacting the panel 14.

In the embodiment shown in FIGS. 7 and 8, the strip 16 includes the inner side 48 and the outer side 50 spaced from the inner side 48, as set forth above. For example, the inner side 48 may be the same as one side edge 60, and the outer side 50 may be the same as the other side edge 62. In other words, the inner side 48 and the outer side 50 may be the two side edges 60, 62 of the strip 16. The inner side 48 may extend along the inboard side 52 of the panel 14 in a direction from the top 20 to the bottom 22. For example, the inner side 48 may match the curved contour of the inboard side 52 of the panel 14, as shown in FIG. 8. The inner side 48 may be attached to the inboard side 52 of the panel 14 at the top edge 56 and the bottom edge 58 of the strip 16.

With continued reference to FIGS. 7 and 8, the inner side 48 may be partially spaced from the inboard side 52 of the panel 14. For example, the inner side 48 of the strip 16 may be spaced from the inboard side 52 of the panel 14 between the top edge 56 of the strip 16 and the bottom edge 58 of the strip 16. In other words, the inner side 48 of the strip 16 and the inboard side 52 of the panel 14 may define a gap 90, as numbered in FIG. 8. The gap 90 may extend along the inner side 48 of the strip 16 and have any suitable shape, e.g., a crescent moon shape.

The outer side 50 may be spaced from the inboard side 52 of the panel 14, as shown in FIG. 8. The outer side 50 of the strip 16 may extend in a direction from the top 20 to the bottom 22 of the panel 14. The outer side 50 may be disconnected from the inboard side 52 of the panel 14 from the top 20 to the bottom 22.

As set forth above, the top edge and the bottom edge 58 may be connected to the inboard side 52 of the panel 14. In the embodiment shown in FIGS. 7 and 8, the top edge 56 and bottom edge 58 may be partially connected to the inboard side 52 of the panel 14. In other words, the top edge 56 and the bottom edge 58 may each include a connected portion 76 and a disconnected portion 78. For example, the connected portion 76 of the top edge 56 and the bottom edge 58 may be connected to the inboard side 52 of the panel 14 adjacent to the inner side 48 of the strip 16. The disconnected portion 78 of the top edge 56 and the bottom edge 58 may be disconnected from the inboard side 52 of the panel 14 adjacent to the outer side 50 of the strip 16. In other words, the disconnected portion 78 of the top edge 56 and the bottom edge 58 of the strip 16 may extend from the inboard side 52 of the panel 14 to the outer side 50 of the strip 16, i.e., partially transverse to the inboard side 52 of the panel 14, as shown in FIG. 7.

With continued reference to FIGS. 7 and 8, in operation, the outer side 50 of the strip 16 may be disposed between the inboard side 52 of the panel 14 and the occupant. The gap 90, the inner side 48 of the strip, and the inboard side 52 of the panel 14 create the pocket 88 facing the head of the occupant. During the vehicle impact, the momentum of the occupant may force the occupant into the inboard side 52 of the panel 14. Specifically, the head of the occupant may be forced into the pocket 88, and may be partially covered by the strip 16. After impacting the inboard side 52 of the panel 14, the head of the occupant may rebound away from the inboard side 52 of the panel 14 towards vehicle components. In this situation, the head of the occupant may impact the strip 16. The strip 16 may provide a counteracting force against the head of the occupant rebounding from the panel 14 to increase the time that the head of the occupant is contacting the panel 14.

The airbag assembly 36 may include an inflator 80 in fluid communication with the airbag 10 that inflates the airbag 10 from the uninflated position to the inflated position. The inflator 80 expands the airbag 10 with an inflation medium, such as a gas, to move the airbag 10 from the uninflated position to the inflated position. Specifically, the inflator 80 may be in communication with the inflation chamber 18 to supply the inflation medium to the inflation chamber 18. The inflator 80 may be supported by the roof 32, e.g., disposed in the base 42 of the airbag assembly 36, or mounted directly to the roof side rail 38, as shown in FIG. 1. Alternatively, the inflator 80 may be disposed at any other suitable part of the vehicle 12, e.g., at the pillars.

The inflator 80 may be, for example, a pyrotechnic inflator 80 that uses a chemical reaction to drive the inflation medium into the airbag 10. Alternatively, the inflator 80 may be, for example, a cold-gas inflator 80 that, when activated, ignites a pyrotechnic charge that creates an opening for releasing the pressurized inflation medium to the airbag 10 via a fill tube (not shown). Alternatively, the inflator 80 may be of any suitable type, for example, a hybrid inflator 80.

Figure 9:
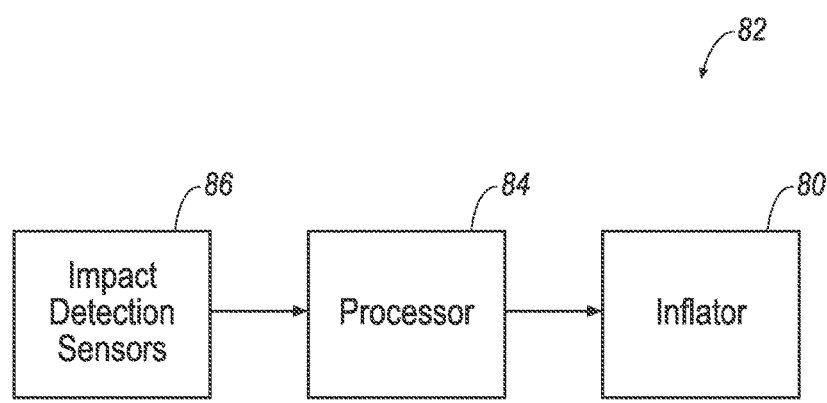
FIG. 9 is a flowchart of an inflation system of the vehicle.

With reference to FIG. 9, the vehicle 12 may include an inflation system 82. The inflation system 82 includes a processor 84 programmed to initiate an inflation of the airbag 10 in response to the vehicle impact. The processor 84 may be embedded in a microcontroller. The microcontroller may include memory, etc. The memory of the microcontroller may store instructions executable by the processor 84 and the processor 84 may read the instructions from the memory and execute the instructions.

The vehicle 12 may include impact detection sensors 86 programmed to detect the vehicle impact to the vehicle 12. The impact detection sensors 86 may be disposed in the roof 32 or elsewhere in the vehicle 12. The impact detection sensors 86 may be of various types, e.g., pressure sensor, acceleration sensor, vision sensor, etc. When the vehicle impact occurs, the processor 84 may receive one or more signals from the impact detection sensors 86 indicating the vehicle impact. In response to receiving the signals from the impact detection sensors 86, the processor 84 may initiate the inflation of the airbag 10. Alternatively, the processor 84 may initiate the inflation of the airbag 10 selectively based on information from the impact detection sensors 86 identifying the physical characteristics of the vehicle impact, e.g., which side of the vehicle 12 impacted, amount of pressure applied to the vehicle 12, etc. and also seat occupancy information, e.g., by using the occupancy sensors disposed inside the seats 24 sensing the occupancy status of the seats 24.

In order to receive the signals from the impact detection sensors 86 and to initiate the inflation of the airbag 10, the processor 84 communicates with the impact detection sensors 86 and the inflator 80, e.g., through a direct electrical wiring, through which an analog or a digital signal is transmitted, or through a communication network like CAN (Control Area Network), Ethernet, LIN (Local Interconnect Network) or any other way.

In operation, the airbag 10 is in the uninflated position, as shown in FIG. 1, under normal operating conditions of the vehicle 12. When the impact detection sensors 86 sense an impact of the vehicle 12, the processor 84 triggers the inflator 80 to inflate the airbag 10 with the inflation medium from the uninflated position to the inflated position. As the occupant moves within the vehicle 12 due to the momentum of the vehicle impact, the occupant may move towards the panel 14. After the head of the occupant impacts the panel 14, the head of the occupant may rebound away from the panel 14. In this situation, the head of the occupant may impact the strip 16, as set forth above. The strip 16 may assist in retaining the head of the occupant against the inboard side 52 of the panel 14 to reduce the rotation of the head of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising;
a roof;
an airbag supported by the roof, the airbag including an inflation chamber and being inflatable away from the roof to an inflated position, the airbag including an inboard side and including a top adjacent to the roof and a bottom spaced from the top in the inflated position; and
a strip connected to the inboard side of the airbag and disposed external to the inflation chamber;
wherein the strip extends along the inboard side of the airbag from the top to the bottom, and the strip includes a top directly connected to the top of the airbag, a bottom connected to the bottom of the airbag, and a distal edge disconnected from the airbag to create a pocket between the strip and the inboard side, the distal edge extending from the top to the bottom of the strip.

2. The system according to claim 1, wherein the strip includes a top edge, a bottom edge spaced from the top edge, and sides extending from the top edge to the bottom edge, and wherein the top edge of the strip is adjacent to the top of the airbag and the bottom edge of the strip is adjacent to the bottom of the airbag.

3. The system according to claim 2, wherein the top edge and the bottom edge of the strip are connected to the airbag.

4. The system according to claim 1, further comprising a seat, the inboard side facing the seat in the inflated position.

5. The system according to claim 1, further comprising a seat including a seat bottom and a seatback extending upwardly from the seat bottom, and wherein the seat bottom and the seatback define an occupant region, the strip being disposed adjacent to the occupant region when the airbag is in the inflated position.

6. The system according to claim 1, wherein the airbag and the strip are formed of the same material.

7. The system according to claim 1, wherein the strip includes an inner side that matches a curved contour of the inboard side of the airbag.

8. The system according to claim 7, wherein the inner side is connected to the top and the bottom of the airbag and is disconnected from the airbag between the top and the bottom.

9. An airbag comprising;
a panel defining an inflation chamber inflatable to an inflated position;
the panel extending along an axis in the inflated position, the panel including a top and a bottom spaced from the top along the axis in the inflated position;
a strip connected to the panel and disposed external to the inflation chamber, the strip being elongated in a direction from the top to the bottom; and
wherein the strip has an inner side that abuts the panel in the direction from the top to the bottom and that matches a curved contour of the panel in the inflated position, and an outer side spaced from the inner side and being straight.

10. The airbag according to claim 9, wherein the strip includes a top edge, a bottom edge spaced from the top edge, and sides extending from the top edge to the bottom edge, and wherein the top edge of the strip is adjacent to the top of the panel and the bottom edge of the strip is adjacent to the bottom of the panel.

11. The airbag according to claim 10, wherein the top edge and the bottom edge of the strip are connected to the panel.

12. The airbag according to claim 10, wherein one of the sides of the strip is at least partially disconnected from the panel.

13. The airbag according to claim 12, wherein the other side of the strip is at least partially disconnected from the panel.

14. An airbag comprising;
a panel defining an inflation chamber inflatable to an inflated position;
the panel extending along an axis in the inflated position, the panel including a top and a bottom spaced from the top along the axis in the inflated position;
a strip connected to the panel and disposed external to the inflation chamber, the strip being elongated in a direction from the top to the bottom; and
wherein the strip has a top edge and a bottom edge spaced from each other in the direction from the top to the bottom, and wherein the strip has one twist between the top edge and the bottom edge.

15. An airbag comprising;
an inboard panel defining an inflation chamber inflatable to an inflated position;
the inboard panel extending along an axis in the inflated position, the inboard panel including a top and a bottom spaced from the top along the axis in the inflated position;
a strip disposed external to the inflation chamber, the strip being elongated in a direction from the top to the bottom;
wherein the strip has a top edge and a bottom edge each supported by and connected to the inboard panel, and the top edge and the bottom edge spaced from each other in the direction from the top to the bottom of the inboard panel; and
a ring extending around the strip between the top edge and the bottom edge.

16. The airbag according to claim 15, wherein the ring is made of fabric.

* * * * *